US011174040B2

(12) United States Patent
Beck

(10) Patent No.: US 11,174,040 B2
(45) Date of Patent: Nov. 16, 2021

(54) DEVICE AND METHODS FOR REFUELLING AN AIRCRAFT

(71) Applicant: DESAUTEL, Lyons (FR)

(72) Inventor: Claude Beck, Bordeaux (FR)

(73) Assignee: DESAUTEL, Lyons (FR)

( * ) Notice: Subject to any disclaimer, the term of this patent is extended or adjusted under 35 U.S.C. 154(b) by 0 days.

(21) Appl. No.: 16/978,684

(22) PCT Filed: Mar. 5, 2019

(86) PCT No.: PCT/EP2019/055437
§ 371 (c)(1),
(2) Date: Sep. 5, 2020

(87) PCT Pub. No.: WO2019/170668
PCT Pub. Date: Sep. 12, 2019

(65) Prior Publication Data
US 2021/0039810 A1    Feb. 11, 2021

(30) Foreign Application Priority Data

Mar. 6, 2018    (FR) ...................................... 1851928

(51) Int. Cl.
*B64F 1/28*    (2006.01)
*B67D 7/16*    (2010.01)
(Continued)

(52) U.S. Cl.
CPC .................. *B64F 1/28* (2013.01); *B67D 7/04* (2013.01); *B67D 7/16* (2013.01); *B67D 7/32* (2013.01); *B67D 2007/329* (2013.01)

(58) Field of Classification Search
CPC ........ B67D 7/04; B67D 7/042; B67D 7/0425; B67D 7/016; B67D 7/032; B67D 2007/0329; B64F 1/28
See application file for complete search history.

(56) References Cited

U.S. PATENT DOCUMENTS 6,374,870 B1    4/2002 Müller
2007/0051852 A1*   3/2007 McCoskey ................ B64F 5/20
                                                                244/137.1
(Continued)

FOREIGN PATENT DOCUMENTS

DE    202004001186 U1    6/2005
EP        0117702 A2    9/1984
WO    2010128246 A2    11/2010

OTHER PUBLICATIONS

Translation of DE 2004 001186 (Year: 2004).*
International Search Report for Patent Application No. PCT/EP2019/055437, dated May 14, 2019, 2 pp.

*Primary Examiner* — Jason K Niesz
(74) *Attorney, Agent, or Firm* — Soquel Group LLC

(57) ABSTRACT

A device for refueling an aircraft, including a fuel flow duct, the downstream end of which is equipped with a wing coupler for connecting it to an inlet orifice of a fuel tank of the aircraft. The wing coupler includes a body, and a front valve that is movable with respect to the body. The wing coupler includes at least one detection member for detecting the position of the front valve, and an electrical or electronic transmission system for transmitting to a processing unit a signal representing the position of the front valve as detected by the at least one detection member.

16 Claims, 5 Drawing Sheets

(51) Int. Cl.
B67D 7/04 (2010.01)
B67D 7/32 (2010.01)

(56) References Cited

U.S. PATENT DOCUMENTS

2012/0043425 A1* 2/2012 Beck .................. B64F 1/28
244/135 A
2014/0129038 A1* 5/2014 Finnell ................ B67D 7/344
700/283

* cited by examiner

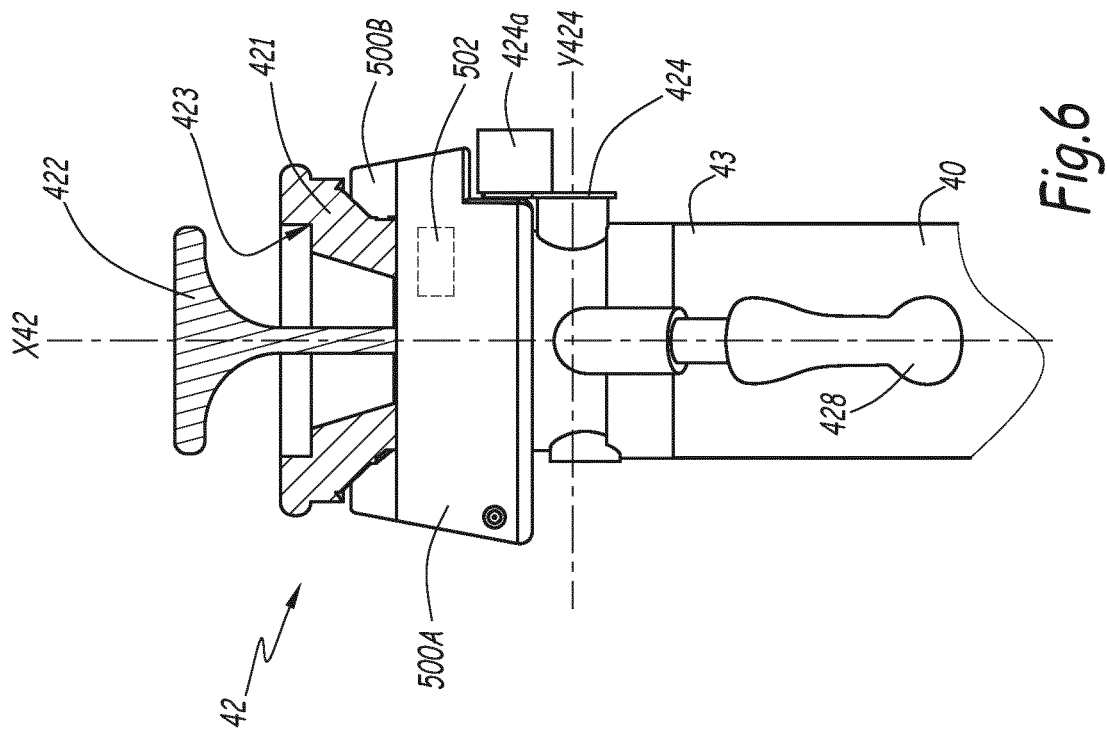
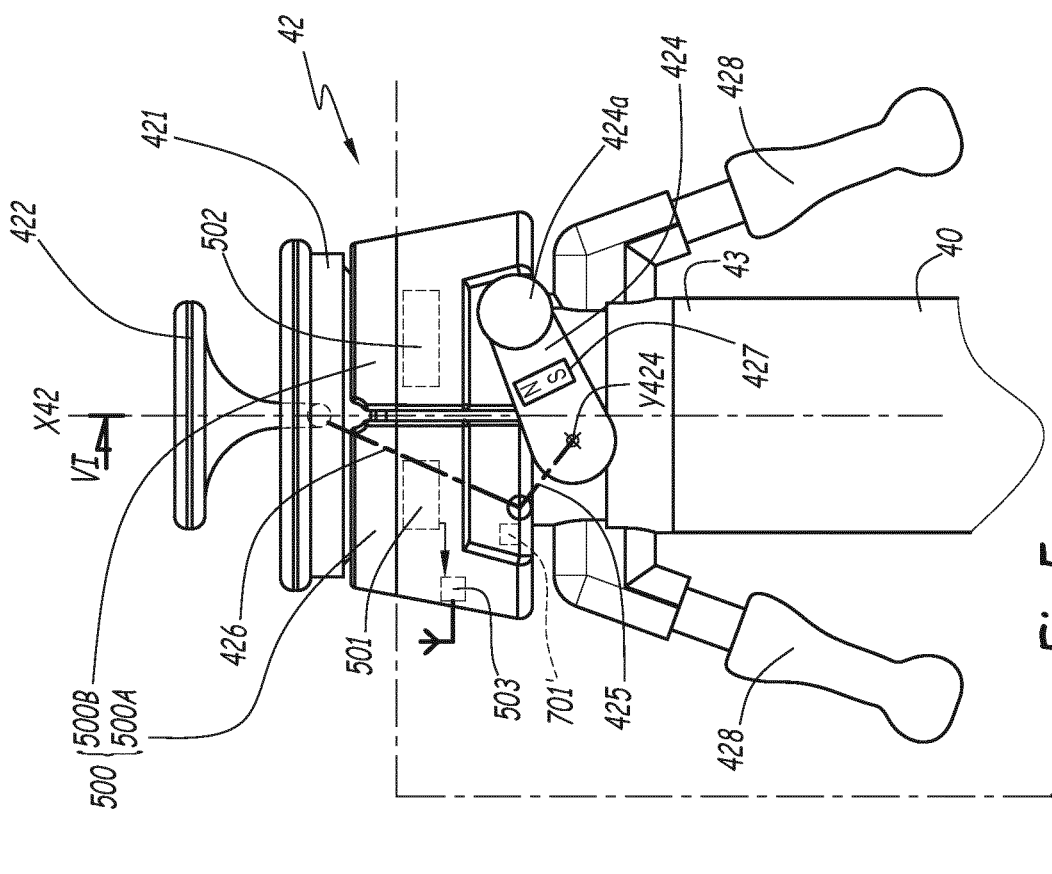
Fig.5
Fig.6

DEVICE AND METHODS FOR REFUELLING AN AIRCRAFT

CROSS-REFERENCE TO RELATED APPLICATIONS

This application claims benefit under 35 USC § 371 of PCT Application No. PCT/EP2019/055437 entitled DEVICE AND METHODS FOR REFUELING AN AIRCRAFT, filed on Mar. 5, 2019 by inventor Claude Beck. PCT Application No. PCT/EP2019/055437 claims priority of French Patent Application No. 18 51928, filed on Mar. 6, 2018.

FIELD OF THE INVENTION

The present invention relates to a device for refueling an aircraft, as well as methods for refueling an aircraft, by means of such a device.

BACKGROUND OF THE INVENTION

At civil and military airports and aerodromes, it is known to use refueling devices that are moved near aircraft to fill their tanks with fuel.

Thus, WO-A-2010/128246 discloses a refueling vehicle whose wing coupler is equipped with a sensor making it possible to determine the value of a parameter, such as the pressure, of a fuel flow passing through this wing coupler. This device has proved satisfactory. Alternatively, the sensor may be used with one or more other flow parameters, including the temperature or flow rate.

To be able to function, the sensor and its associated electronics must be supplied with electric current, which requires the use of at least one battery, or an assembly comprising a turbine and an alternator. In the first case, the uptime of the refueling device depends on the life of the battery, the replacement of which requires periodic maintenance operations, to ensure that the sensor and its associated electronics are always energized when necessary so as to function. In the second case, the added mass of the turbine and the alternator, which are integrated into the coupler head, may make difficult the manipulations carried out by the operator at the start and end of refueling. In addition, this equipment is relatively complex, expensive and a priori less reliable than batteries.

On the other hand, the refueling devices, including the wing coupler, must be subject to periodic scheduled maintenance operations, which do not take into account the actual use of the refueling device, while the actual use may vary greatly, from one airport or aerodrome to another, or depending on the type and number of aircraft for which the refueling device is provided.

SUMMARY OF THE DESCRIPTION

It is these drawbacks that the invention more particularly intends to remedy by proposing a new device for refueling an aircraft, the maintenance operations of which may be planned in an optimized manner.

To this end, the invention relates to a device for refueling an aircraft, wherein this device comprises a fuel flow duct, the downstream end of which is equipped with a wing coupler for its connection to an inlet orifice of an aircraft fuel tank. This wing coupler features a body and a front valve that is movable relative to the body. According to the invention, the wing coupler also comprises at least one device for detecting the position of the front valve, as well as an electrical or electronic transmission system to transmit towards a processing unit a signal representative of the position of the front valve detected by the detection device.

Thanks to the invention, when the wing coupler is equipped with a sensor for measuring the value of a parameter representative of fuel flow, it is possible to supply this sensor and its associated electronics with electric current only when the detection unit has detected that the front valve is in an open position and corresponds to an effective use of the refueling device. This makes it possible to extend the life of the sensor supply battery and its associated electronics and, consequently, to schedule the standard exchange or recharging of this battery. According to another aspect of the invention, independent of the use of a sensor for measuring the value of a parameter, the detection device makes it possible to count and memorize the operations of the front valve and/or its periods of use, which allows, here again, the planning of preventive maintenance operations as a function of the actual use of the refueling device.

According to advantageous but not mandatory aspects of the invention, such a device may incorporate one or more of the following characteristics, taken in any technically feasible combination:

- The detection device detects the position of the front valve indirectly, based on the position of a lever for operating the front valve.
- The detection unit comprises a proximity sensor mounted on the body of the wing coupler, near the lever when the latter is in a predetermined position, in particular in a position where the front valve is in the closed or completely open position.
- The detection device detects the position of the front valve directly.
- The detection device comprises an electrical contact, in particular a dry electrical contact, preferably a reed switch.
- The refueling device comprises a sensor for measuring the value of a parameter representative of fuel flow passing through the wing coupler, at least one battery for the electrical supply of this sensor, and an electronic control unit for connection of the supply battery and the sensor according to the position of the front valve as detected by the detection device.
- The refueling device comprises a unit for counting the maneuvers of the wing coupler and/or the periods of actual use of the wing coupler, on the basis of a signal representative of the detected position of the front valve, as transmitted by the electrical or electronic transmission system.
- The refueling device comprises a memory for storing the number of operations of the front valve detected by the detection device, while the electrical or electronic transmission system comprises a portable terminal intended to retrieve this number of operations stored in the memory, wherein this portable terminal is designed to be connected to a computer forming a processing unit.

According to another aspect, the invention relates to a method for refueling an aircraft by means of a device as mentioned above, but where this refueling method comprises a step consisting in using the signal transmitted by the electrical or electronic means for controlling the means for supplying electric current to a sensor for measuring the value of a parameter representative of fuel flow passing through the wing coupler.

This method of the invention takes advantage of the fact that the signal transmitted by the electrical or electronic means makes it possible to know the position of the front valve, and, therefore, the periods when the sensor and its associated electronics are supplied with electric current.

According to another aspect, the invention relates to a method for refueling an aircraft by means of a refueling device as mentioned above, wherein this device comprises a sensor for measuring the value of a parameter representative of fuel flow passing through the wing coupler, as well as at least one battery for supplying this sensor, and a unit for connecting the supply battery and the sensor. The frequency of connection of the supply battery and the sensor is adapted according to the proximity of the value measured by the sensor to a predetermined threshold value.

Thanks to this aspect of the invention, the demand on the supply battery may be reduced when the value of the representative parameter is not very critical, i.e. far from the predetermined threshold value, while it may be increased in the contrary case when the value of this parameter approaches this predetermined threshold value.

According to another aspect, the invention relates to a method of refueling an aircraft by means of two refueling devices like the one mentioned above, wherein each refueling device comprises a sensor for measuring the value of a parameter that is representative of fuel flow passing through the wing coupler, at least one supply battery for this sensor, and a unit for connecting the supply battery and the sensor. For a first refueling device among these two refueling devices, the frequency of connection of the supply battery and the sensor has a first value. For the second refueling device among these two refueling devices, the frequency of connection of the supply battery and the sensor has a second value distinct from the first value, in particular less than this first value.

By virtue of this aspect of the invention, the demand on the battery of the second fueling device may be reduced by considering that the first refueling device serves as the master for flow control while the second refueling device serves as a slave.

According to yet another aspect, the invention relates to a method of refueling an aircraft by means of a refueling device as mentioned above, in which the detection member is designed to detect when the valve is in an intermediate position between a closed position and a completely open position. This method comprises at least steps consisting of:
- b) determining a period during which the front valve is in the intermediate position;
- c) comparing the duration determined in step b) with a threshold value; and
- d) depending on the result of the comparison of step c), determining that the locking maneuver of the coupler on the aircraft takes place in a normal or abnormal manner.

By virtue of this aspect of the invention, it is possible to detect a non-functional configuration of the refueling device, where the valve remains in an intermediate position for a period of time greater than that required for the simple movement between the closed position and the open position. This aspect of the invention makes it possible to increase the operating safety of the refueling device, in particular by controlling normal locking during maneuvering, and in the final position.

BRIEF DESCRIPTION OF THE DRAWINGS

The invention will be better understood and other advantages thereof will emerge more clearly in the light of the description which follows of several embodiments of a refueling device according to the invention and of associated refueling methods, given only by way of example and made with reference to the accompanying drawings, in which:

FIG. 5 is a view similar to FIG. 2 when the wing coupler is in a second configuration of use;

FIG. 6 is a view partially in axial section, along the line VI-VI in FIG. 5;

DETAILED DESCRIPTION

Figure 1:
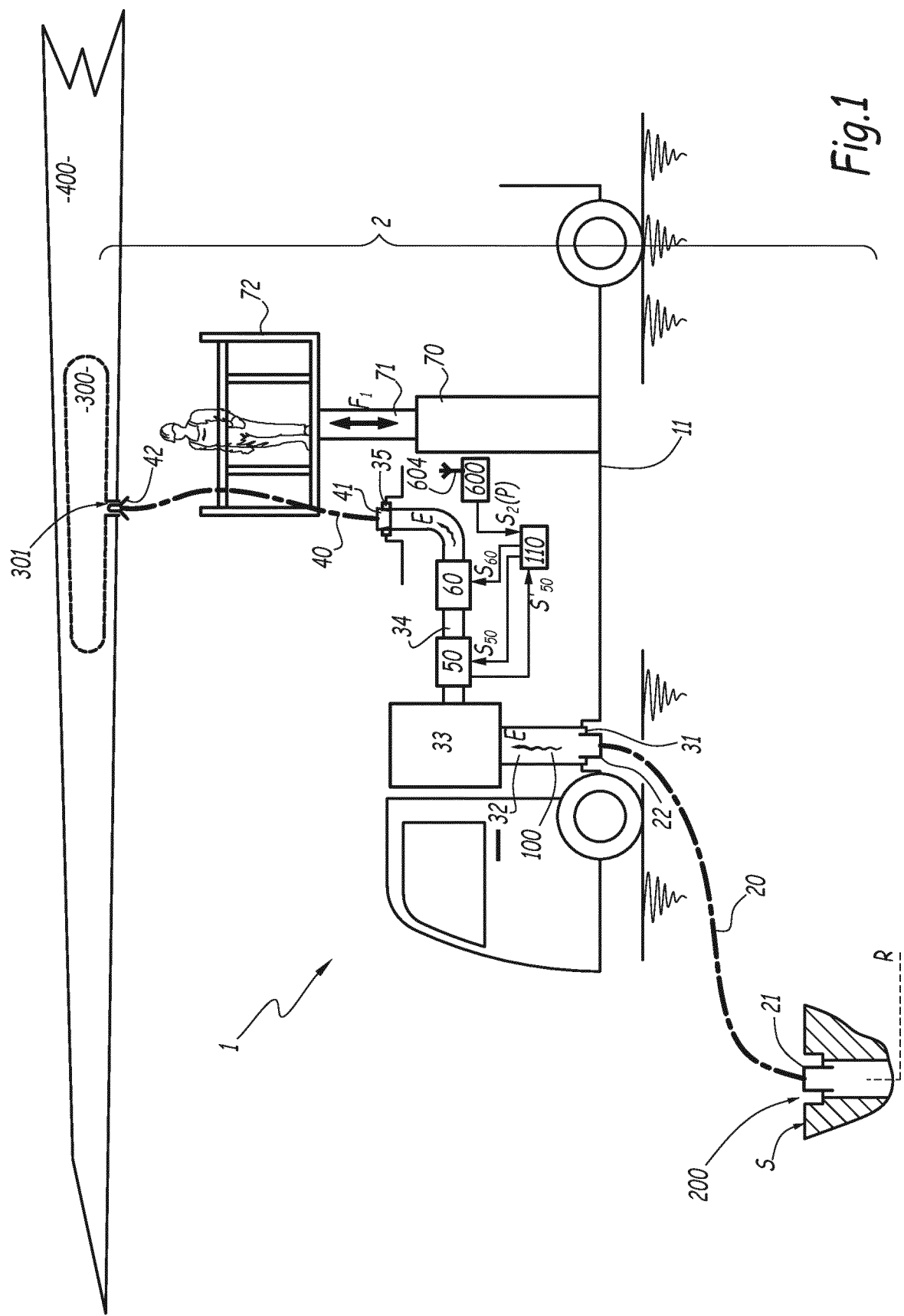
FIG. 1 is a schematic representation of the principle of a refueling vehicle including a refueling device according to the invention when used to fill the tank of an aircraft with fuel.

The fuel bowser 1 shown in FIG. 1 is generally in the form of an industrial vehicle equipped with a flexible pipe 20 allowing it to be connected to an outlet mouth 200 belonging to a fixed fuel distribution network R at an airport. The mouth 200 is under the surface S of the ground in the vicinity of a parking space for an aircraft 400. The pipe 20 is equipped with a connector 21 for connecting to the mouth 200. At its end opposite the connector 21, the pipe 20 is equipped with another connector 22 for connection to a connector 31 constituting the mouth of a fixed duct 32 of the bowser 1. In other words, the pipe 20 makes it possible to connect the outlet mouth 200 which belongs to the fixed network R, to the conduit 32, which belongs to the bowser 1.

The line 32 opens into a filter 33 that is provided to rid the fuel of residues, in particular aqueous residues, which it may contain.

Downstream of the filter 33, a duct 34 extends to a connector 35 to which is connected an upstream connector 41 of a second flexible pipe 40. A wing coupler 42 is connected to the downstream end 43 of the second flexible pipe 40 and constitutes a means of connecting the pipe 40 to an inlet orifice 301 of a tank 300 integrated into the wing 400 of an aircraft.

According to an optional aspect of the invention which is not shown for clarity of the drawing, but which is usual in practice, a doubling of the second flexible pipe 40 and the wing coupler 42 is conceivable.

For clarity of the drawings, the flexible pipes 20 and 40 are shown in FIG. 1 by centerlines corresponding to their respective longitudinal axes.

Parts 20 to 42 belong to a refueling device 2 which is part of the bowser 1.

Figure 3:
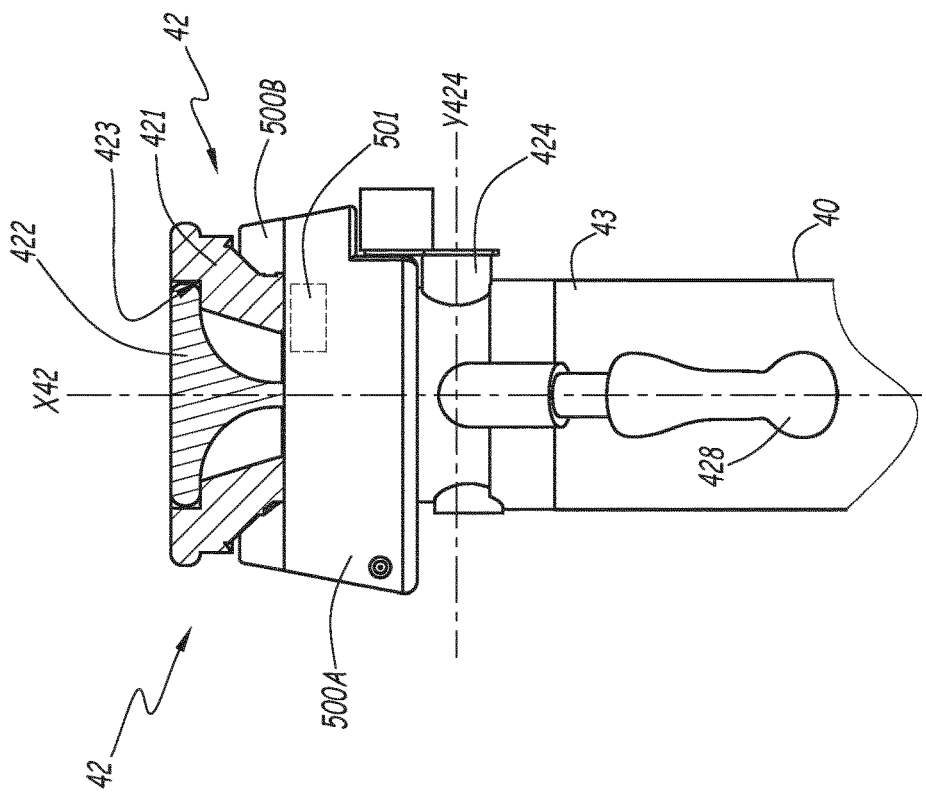
FIG. 3 is a view partially in axial section, along the line III-III in FIG. 2.

The wing coupler 42 comprises a cylindrical body 421 equipped with a ring, not shown but known per se, preferably with the international profile ISO45, allowing its locking by the interaction of shapes on a corresponding connector, also not shown but known per se, delimiting the orifice 301. The wing coupler 42 is also provided with a valve 422, called the front valve, which is movable in translation along a longitudinal axis X42 of the wing coupler 42, between a first closed position shown in FIGS. 2 and 3, wherein this front valve 422 bears against a seat 423 formed by the body 421, and a second open position shown in FIGS. 5 and 6, wherein the front valve 422 is at a distance from the seat 423.

In its first closed position, the front valve 422 prevents the flow of fuel from the flexible hose 40 to the tank 300. In its second open position, the front valve 422 allows such a fuel flow.

The movement of the front valve 422 between its first and second positions is effected using a lever 424 which is mounted to pivot on the body 421 about an axis Y424 that is perpendicular to the longitudinal axis X42. The lever 424 is movable about the axis Y424 between the two extreme positions shown respectively in FIGS. 2 and 3, on the one hand, and FIGS. 5 and 6, on the other hand. A set of articulated connecting rods 425 and 426, shown very schematically (in transparent form) in FIGS. 2 and 5, connects the lever 424 to the valve 422 and transforms the rotational movement of the lever 424 about the axis Y424, into a translational movement of the front valve along the axis X42.

Use may be made here of the technical teaching of U.S. Pat. No. 4,567,924 which is incorporated herein by reference. Other movement transmission systems between the lever 424 and the front valve 422 are also conceivable.

The lever 424 is equipped with a handle 424a, which allows exertion of a driving torque in rotation of this lever about the Y424 axis.

The body 421 is, for its part, equipped with two handles 428, which allow an operator to approach the orifice 301 or to move it away from it, respectively at the start and at end of refueling. The wing coupler 42 is locked on the orifice 301 and unlocked relative to it by rotation about the axis X42, respectively at the start and at the end of refueling.

As a variant, the two handles 428 may be replaced by a control wheel.

The elements 32 to 34 together define a fixed fuel flow path between two flexible lines formed respectively by the pipes 20 and 40. This fixed flow path and these flexible lines extend within the refueling device 2 between the connector 21 for connection to the network R and the wing coupler 42 for connection to the orifice 301.

We denote by E the flow of fuel between the mouth 200 and the tank 300.

The refueling device 2 is equipped with a meter 50 which makes it possible to measure the quantity of fuel passing through the pipe 34 via the flow E, i.e. the quantity of fuel delivered to the tank 300. The refueling device 2 also comprises a pressure regulator 60 which makes it possible to control the pressure of the flow E in the downstream portion of the duct 34.

An electronic unit 110 belonging to the refueling device 2 is mounted on the frame of the bowser 1 and controls the meter 50, the pressure regulator 60, respectively, by suitable electronic signals $S_{50}$ and $S_{60}$. As for the meter 50, it provides a signal $S'_{50}$ representative of the counting which it performs, to the unit 110.

The bowser 1 comprises a hydraulic cylinder 70, the piston rod 71 of which is equipped with a platform 72 to carry an operator to manipulate the downstream part of the pipe 40, in particular the wing coupler 42. The rod 71 allows the operator to access the inlet orifice 301 through his upward or downward vertical movement represented by the double arrow $F_1$.

A module 500, which also belongs to the refueling device 2, is arranged around the body 421 of the wing coupler 42. This module 500 is in the form of two half-shells 500A and 500B which enclose the body 421. The module 500 comprises a cell 501 for measuring the pressure of the flow E just before its exit from the wing coupler 42. The cell 501 is housed in the half-shell 500A.

Given the location of the module 500 in the immediate vicinity of the wing coupler 42, the cell 501 makes it possible to know, with a satisfactory degree of precision, the pressure of the flow E when it enters the tank 300 through the orifice 301. In other words, the location of the module 500, at the level of the connection means formed by the wing coupler 42, allows the cell 501 to give a value that is representative of the pressure P of the flow E passing through the wing coupler 42 when it enters the tank 300. As such, the cell 501 forms a sensor for measuring the value of this pressure. In the example, the module 500 is in the vicinity of the front valve 422, so that the distance between the cell 501 and the point of transfer of the fuel from the refueling system to the aircraft is less than 10 cm. The fuel transfer point is identified at the exit of the wing coupler 42 as the point where the ownership of the fuel passes from the company providing the fuel to the company operating the aircraft.

The cell 501 is supplied with electrical energy from a battery 502, housed in the half-shell 500B. Electrical conductors (not shown) extend between the half-shells 500A and 500B to interconnect the cell 501 and the battery 502.

The cell 501 is electrically connected to a radio transmitter 503 also housed in the half-shell 500A and powered by the battery 502. The cell 501 supplies the transmitter 503 with an electronic signal $S_0(P)$ corresponding to the value of the pressure that it measures.

The transmitter 503 is equipped with an antenna 504 which allows it to transmit a wireless signal $S_1(P)$ including data corresponding to the value of the pressure P measured by the cell 501. By way of example, the transmission signal $S_1(P)$ is provided by radio frequency but, as a variant, it may be provided by infrared.

Moreover, the refueling device is equipped with a receiver 600 paired with the module 500 and whose antenna 604 allows it to receive the signal $S_1(P)$.

The receiver 600 is then able to transmit to the electronic control unit 110 a signal $S_2(P)$ representative of the pressure P of the flow E detected by the cell 501.

The unit 110 may then take into account the value of this pressure P to control, in particular, the pressure regulator 60 by means of the appropriate electronic signal $S_{60}$.

For the pressure sensor formed by the cell 501 to operate efficiently, it is important that it be supplied with electrical energy from the battery 502 at a sufficient level. Thus, the level of this battery 502 is critical for the operation of the bowser 1.

In order to prevent the battery 502 from discharging when the wing coupler is not in use, and taking into account the fact that the cell 501 only needs to be powered when a flow E actually passes through the wing coupler 42, provision may be made to arrange for the power supply to be provided to the cell 501 from the battery only when there is a flow E.

In the light of the above, the wing coupler 42 is equipped with a member 701 for detecting the position of the valve 422, which makes it possible to determine whether a flow E is likely to actually take place through the wing coupler 42, since the position of the front valve 422 determines the possibility of such a flow.

In this first embodiment, the detection member 701 is integrated into the half-shell 500B and is positioned to indirectly detect the position of the front valve 422 by detecting the position of the lever 424. In fact, as the kinematic connection between the lever 424 and the valve 422 is unambiguous, thanks to the connecting rods 425 and 426, it is sufficient to identify the position of the lever 424 to determine that of the front valve 422.

This takes advantage of the fact that, when handling the wing coupler 422, the operator is expected to operate the lever 424 to move the valve 422 between its first and second positions, at the start of refueling, then between its second and first positions, at the end of refueling.

Figure 4:
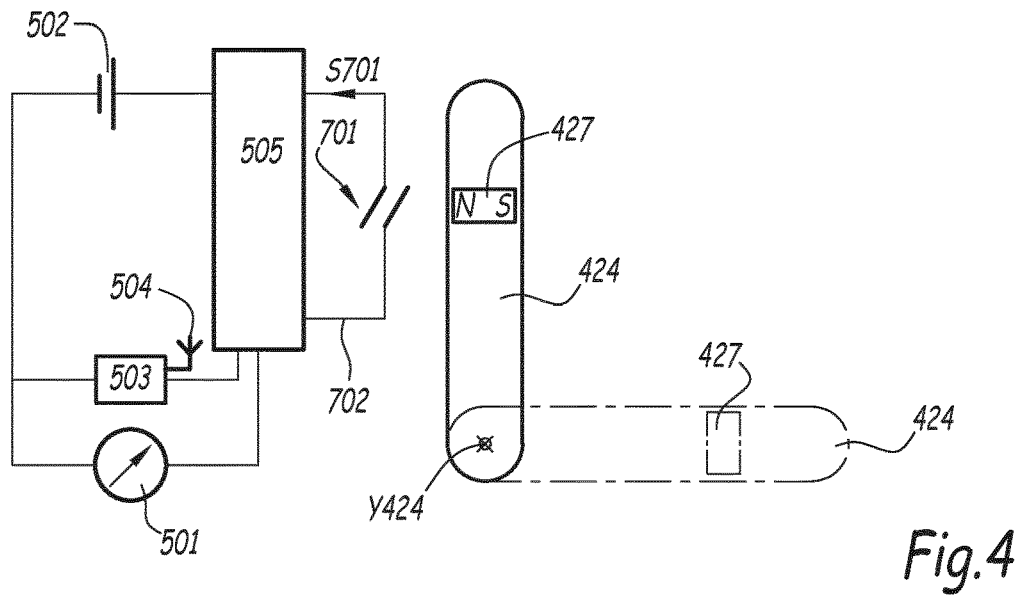
FIG. 4 is a schematic representation of a power supply subsystem of a pressure sensor and a transmitter mounted on the wing coupler of FIGS. 2 and 3.

The detection member 701 may be in the form of a proximity sensor capable of reacting to the presence of the lever 424 in its immediate environment. This proximity sensor may comprise an electrical contact, preferably a dry electrical contact, capable of reacting to the presence of a magnetic member such as a permanent magnet 427 mounted on the lever 424. In the example of FIG. 4, a flexible reed switch forms the detection member 701 and is interposed in an electric line 702 connected to an electronic control unit 505 which controls the cell 501 and the transmitter 503 by supplying them with power from the battery 502. The flexible reed switch 701 may adopt an open configuration or a closed configuration, depending on the presence or absence of the magnet 427 in its vicinity. For example, the construction of the reed switch 701 and the positioning of the magnet 427 on the lever 424, as well as the orientation of its poles, may be so designed that when the magnet 427 is sufficiently close to the reed switch 701 to have an influence on its state, the reed switch 701 is open, which corresponds to the solid line configuration in FIG. 4. On the other hand, when the magnet 427 is moved away from the flexible reed switch 701 due to a rotation about the Y424 axis as shown by centerlines, the flexible reed switch 701 is closed (not shown in FIG. 4).

Let us consider an electrical signal S701 representative of the state of the flexible reed switch 701. This electrical signal S701 is equal to zero when the switch is open, while it takes a non-zero value, equal to the intensity of the current flowing in the line 702 when the switch 701 is closed. This electrical signal S701 may be used by the electronic control unit 505 to supply the cell 501 only when the signal S701 is not zero, i.e. when the lever 424 is in a position corresponding to the second position of the front valve 422. The electronic control unit 505 therefore constitutes an electrical signal processing unit S701.

The electronic control unit 505 may use the same rules to power or not the transmitter 503 which also consumes current.

The use of a flexible reed switch 701 is particularly advantageous since such a switch forms a sensing member which does not consume current in itself. However, other types of members for detecting the position of the lever 424 are possible, for example on the basis of a magnetic or inductive effect, in particular from a Hall effect sensor.

In the example of FIGS. 2 to 6, the flexible reed switch 701 is positioned in the half-shell 500B, such that it detects the lever 424 when the latter is in a position corresponding to the second position of the front valve 422.

Another configuration is however possible, as shown by mixed lines in FIG. 5 where another flexible reed switch 701' is positioned in the half-shell 500A, in the vicinity of the lever 424 when the latter is in a configuration corresponding to the first position of the front valve 422.

According to another variant, it is possible to provide two devices for detecting the position of the front valve, such as switches 701 and 701', respectively, in the vicinity of each of the two extreme travel positions of the lever 424 which respectively correspond to the first and second positions of the front valve 422.

Figure 2:
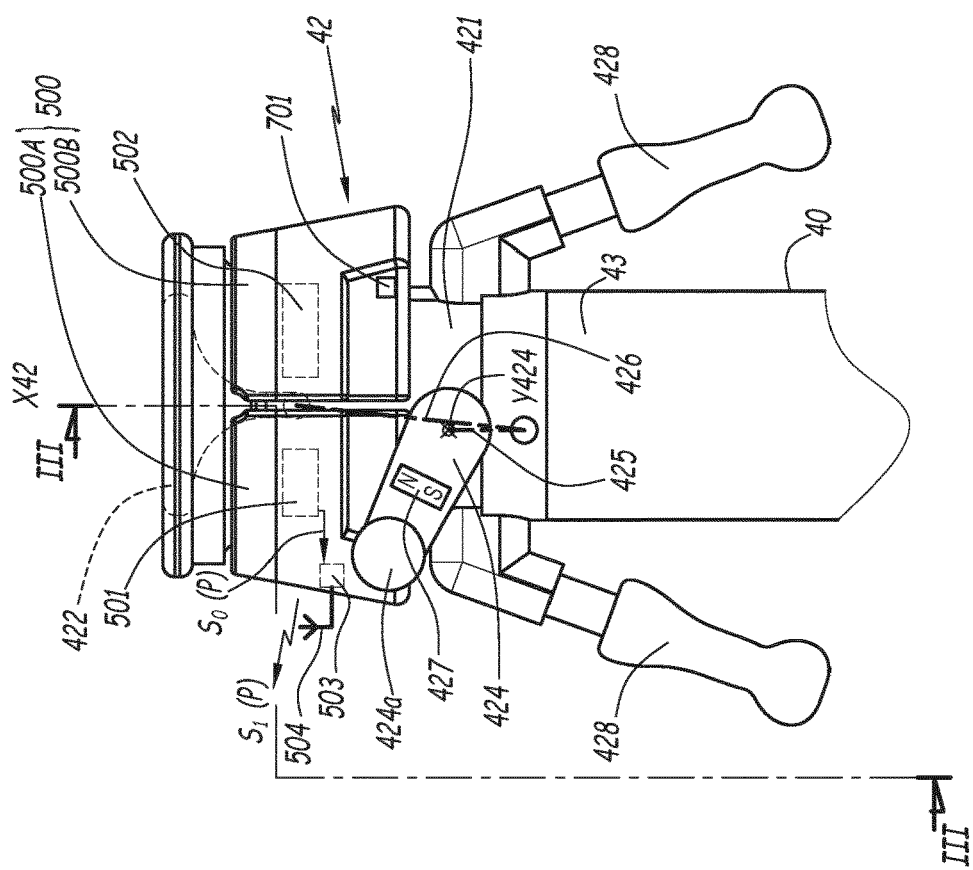
FIG. 2 is an elevational view of a wing coupler and part of a fuel flow duct belonging to the refueling device shown in FIG. 1.

In this case, it is possible to determine when the lever 424 is in an intermediate position, as distinct from its end-of-travel positions shown respectively in FIGS. 2 and 5, since, in this case, it is not close to either of the switches 701 and 701'. In this case, the front valve is also in an intermediate position between its first and second positions. During normal use of the wing coupler 42, the front valve is either in its first closed position or in its second open position corresponding to the refueling of the aircraft 400. The front valve 422 does not pass through an intermediate configuration except for a time interval of relatively short duration $\Delta t$ of less than 2 seconds. The use of the two detection members 701 and 701' makes it possible to detect when the front valve is in neither of its first and second positions and therefore to react if the duration $\Delta t$ during which the front valve is in an intermediate position is greater than a threshold value of $\Delta 0$, for example equal to 5 seconds. In other words, it is possible to ensure additional safety for the bowser 1 by determining a duration $\Delta t$ during which the front valve 422 is in an intermediate position between its first and second positions, by comparing said duration with a threshold value $\Delta 0$, and by considering that the locking maneuver of the coupler upon coupling to the aircraft takes place in a normal or abnormal manner depending on the result of this comparison. More precisely, the locking maneuver which seals the flow E may be considered as taking place in a normal manner when the duration $\Delta t$ is less than the threshold value $\Delta 0$ and abnormal in the contrary case.

In order to better control the power consumption of the cell 501 and of the emitter 503, the criticality of the value of the pressure P measured by the cell 501 may be taken into account. Let us consider the case where the maximum admissible value of the pressure P of the flow E in the wing coupler 42 is 3.5 bar. This threshold value being known, it is possible that the pressure of the flow E inside the wing coupler 42 is much lower than this threshold value, in which case the pressure value detected by the cell 501 is not really critical, in the sense that we may make the reasonable assumption that the bowser 1 will function correctly for a relatively long period of time without exceeding the threshold value of 3.5 bar. On the contrary, when the pressure detected by the cell 501 is close to the threshold value of 3.5 bar, the risk of exceeding this threshold value in the immediate future and of having to limit or interrupt the flow E of the bowser 1 is higher.

It is possible to adapt the pressure measurement periodicity according to the criticality of the pressure measured. In fact, if we consider that the maximum admissible value for the pressure in the wing coupler 42 is 3.5 bar, we may define three pressure levels according to three pressure ranges, namely:

a first range where the pressure is less than a first threshold value P1 equal to 2 bar, a second range where the pressure is greater than the first threshold value P1, and less than a second threshold value P2 equal to 3 bar, and a third range where the pressure is greater than a third threshold value P3 equal to 3 bar.

It is assumed that when the pressure P is less than 2 bar, there is little risk of reaching the value of 3.5 bar very quickly. It is assumed that when the pressure P is between 2 and 3 bar, there is an average risk of reaching the limit value of 3.5 bar. It is assumed that when the pressure P is greater than 3 bar, there is a high risk of reaching the limit value of 3.5 bar.

We define a time interval or time difference, δt, between two successive measurements of the pressure in the wing coupler 42, carried out by means of the cell 501.

Provision may be made that if the pressure detected in the previous step is less than the threshold value P1, then the time difference δt takes a first value δt1. When the threshold value detected in the previous step is between the values P1 and P2, then the time difference δt takes the value δt2. Finally, when the pressure detected in the previous step is greater than the threshold value P2, then the time difference δt takes the value δt3.

The value δt1 is strictly greater than the value δt2 which is itself strictly greater than the value δt3. By way of example, we may predict that δt1 is equal to 500 milliseconds (ms), δt2 is equal to 200 ms and δt3 is equal to 50 ms.

Under these conditions, as long as the pressure value detected by cell 501 is lower than value P1, the measurements may be spaced by δt1, i.e. 500 ms, which makes it possible to connect battery 502 to cell 501 by means of the control unit 505 relatively infrequently, at a frequency of 2 Hertz (Hz) and thus to demand relatively little from the battery 502, so increasing its uptime compared to the case where all measurements take place with a time interval equal to 50 ms. The same is true as long as the pressure lies between values P1 and P2, where the measurements may be spaced by δt2, i.e. 200 ms, therefore where the unit 505 connects the battery 502 to the cell 501 with a frequency of 5 Hz. When the value P measured previously is greater than 3 bar, the time difference is fixed at 50 ms, while the frequency of connection of the battery 502 to the cell 501 is 20 Hz.

Figure 7:
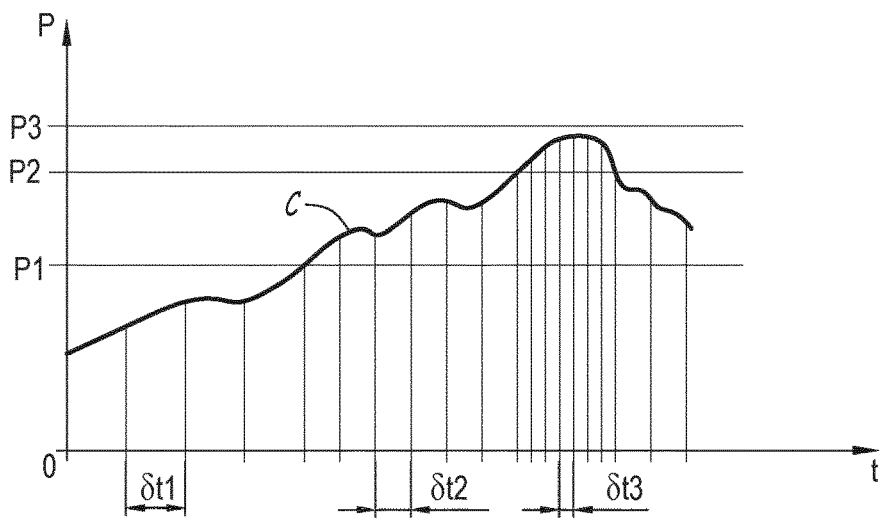
FIG. 7 is a schematic representation of the change in pressure detected by the sensor of FIG. 4 over time.

FIG. 7 shows this approach with curve C which represents the pressure values detected as a function of time.

The numerical values mentioned above are not limiting. Other values are possible for P1, P2, P3, δt1 δt2 and δt3.

Thus, according to this aspect of the invention, the frequency of connection of the battery 502 and of the sensor 501, which is equal to 1/δt, is adapted, depending on whether the measured value P is more or less close to the threshold value P3.

In a variant of the invention which is not shown, it is possible to use two refueling devices, such as the device 2 mentioned above, to fill the same tank 300. In this case, the two refueling devices, which will be called 2A and 2B in the remainder of this description, flow into the same manifold from which the fuel is discharged into the tank 300. It may be assumed that the fuel pressure in each of the two wing couplers 42 of the two refueling devices 2A and 2B is the same, or approximately the same.

In this case, we may consider that one of the two fueling devices, for example the fueling device 2A, constitutes a master device, while the other fueling device, in the example the device 2B, constitutes a slave device. Under these conditions, it is possible that the sampling frequency 1/δtA of the master refueling device 2A is chosen with a relatively high value, for example 20 Hz, while the sampling frequency 1/δtB used for the slave refueling device 2B is chosen with a much lower value, for example equal to 2 Hz. In fact, if the sampling device 2A is the master device, it suffices to monitor the pressure in the wing coupler 42 of this sampling device so as to react in the event of drift. The pressure check in the wing coupler 42 of the slave refueling device 2B is a simple consistency check which may take place at a lower frequency than the check performed on the master refueling device 2A.

In practice, the sampling frequency mentioned above is the frequency of connection of the supply battery 502 and the sensor 501. In other words, it is the unit 505 of each refueling device 2A or 2B which allows adjustment of the sampling frequency to the value 1/δtA or 1/δtB. The numerical values indicated above for the quantities 1/δtA and 1/δtB are not limiting. Other values may be considered for the connection frequencies of the battery 502 and of the sensor 501 in the two refueling devices 2A and 2B.

The fueling device for which this connection frequency is the highest may be considered to be the master fueling device.

Figure 9:
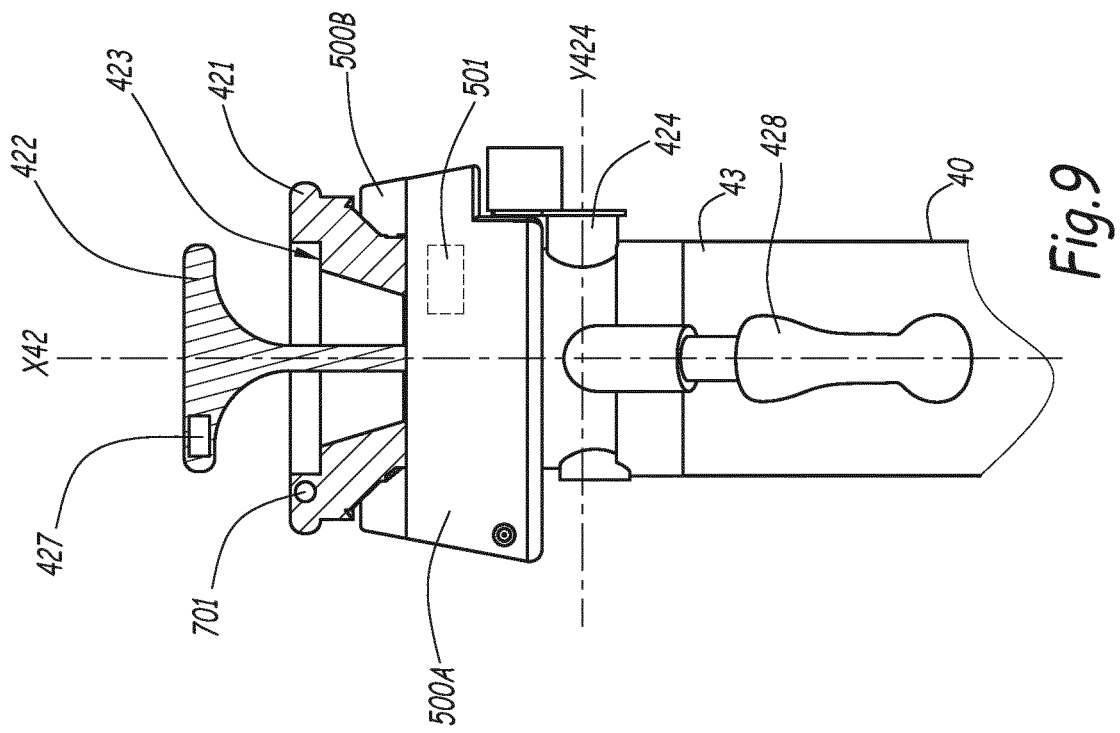
FIG. 9 is a view partially in axial section, similar to FIG. 6, for the device according to the second embodiment
Figure 8:
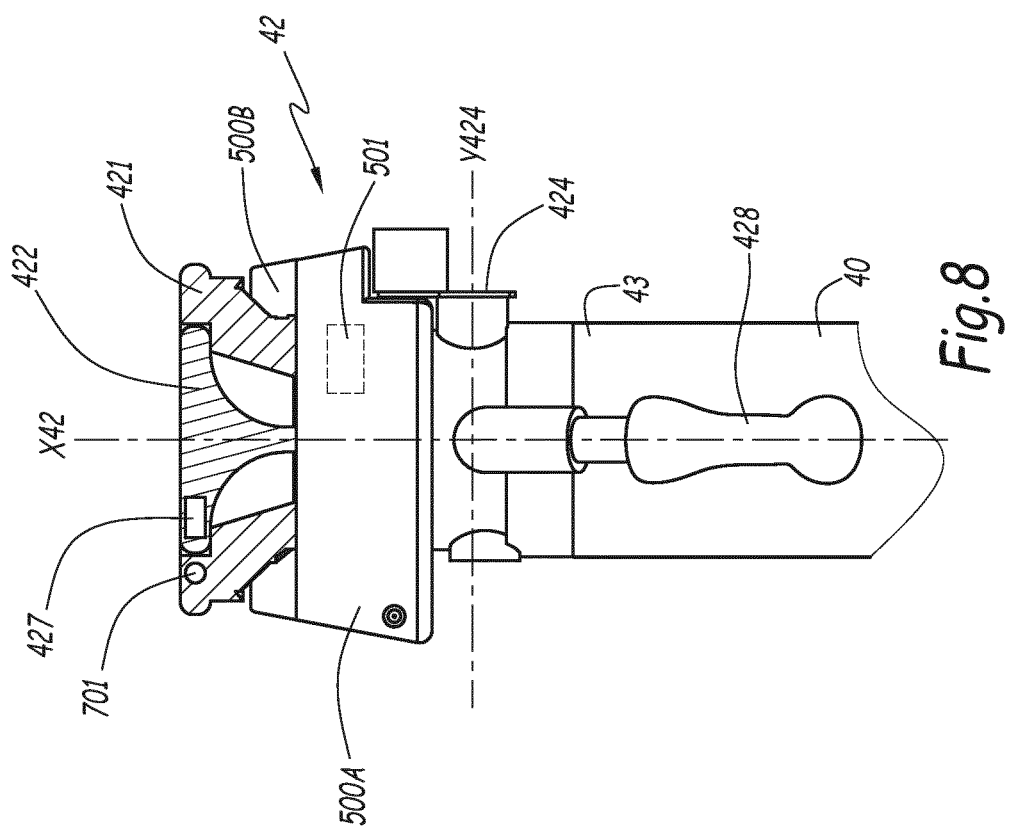
FIG. 8 is a view partially in axial section, similar to FIG. 3, for a device according to a second embodiment of the invention.

In the second embodiment of the invention shown in FIGS. 8 and 9, elements similar to those of the first embodiment bear the same references and operate in the same way. In what follows, we explain what distinguishes one embodiment from the previous one.

In this embodiment, a magnet 427 is integrated in the front valve 42, while a flexible reed switch 701 is integrated in the body 421 of the wing coupler 42. In this case, the detection of the position of the front valve 42 is direct.

In the examples mentioned above, the parameter detected thanks to the cell 501 is the pressure P of the flow E. As a variant, one or more other parameters representative of the flow E passing through the wing coupler 42 may be measured, in particular its temperature T, its flow rate Q, or the volume V which passes through this wing coupler as of a predetermined instant, as well as its density, its mass or its turbidity. The method explained above with regard to the criticality of the pressure measurement may be transposed to the measurement of the other parameters T, Q, V as well as the others mentioned above.

The invention is not limited to the case where the wing coupler 42 is equipped with a sensor to measuring the value of a parameter P, T, Q or V as explained above.

Figure 10:
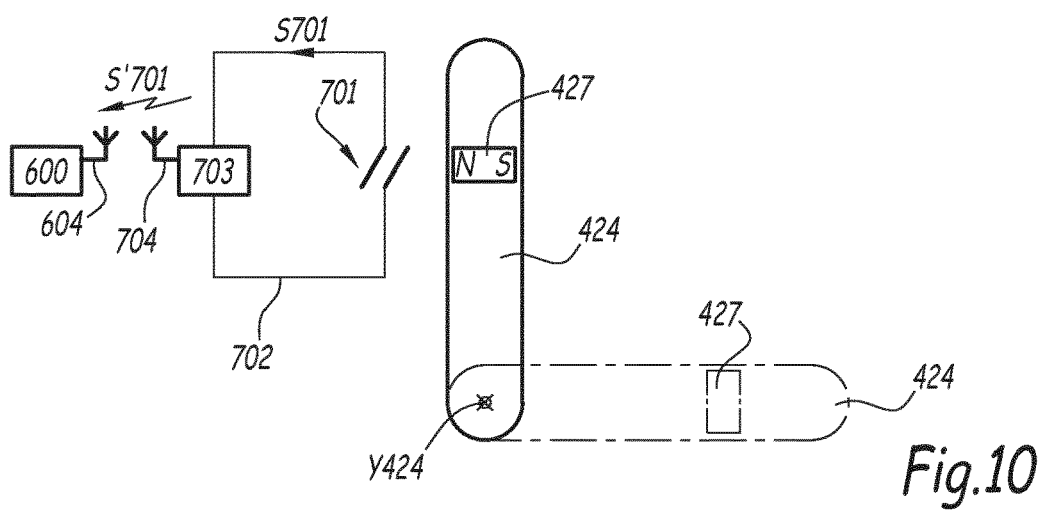
FIG. 10 is a schematic representation similar to FIG. 4, for a device according to a third embodiment of the invention.

In fact, as shown in FIG. 10, the flexible reed switch 701 may be connected via the electric line 702 to an electronic unit 703 equipped with an antenna 704. Depending on the signal S701 delivered by the switch to the flexible reed switch 701, the unit 703 is capable of transmitting, through the antenna 704, a signal S'701 intended for the receiver 600, as envisaged above for the signal $S_2(P)$.

In other words, the sensing element formed by the flexible reed switch 701 keeps the unit 110 aware of the position of the front valve 422 by means of the signal S'701. This applies to the case where this position is detected indirectly, as in the first embodiment, or directly, as in the second embodiment.

The electronic control unit 110 thus forms a signal processing unit S'701.

The electronic control unit 110 may be equipped with a means, such as a microprocessor, making it possible to count the time spent by the front valve 422 in its second position, on the basis of the signal S'701 received by the receiver 600. In fact, this time corresponds to the time of effective use of the wing coupler 422. This makes it possible to plan maintenance operations of this wing coupler according to its actual use, and not periodically without reference to its actual use.

Alternatively, the calculation of the effective usage time of the wing coupler 42 may take place in the electronic unit 703 which then transmits a signal S'701 which depends on this effective usage time. Here again, this makes it possible to plan the maintenance operations of the wing coupler 42 depending on its actual use.

According to another variant, instead of, or in addition to counting the time spent by the front valve 422 in its second position, a microprocessor of the unit 110 or 703 may count the number of movements of this valve between its first and second positions, which corresponds to the number of maneuvers of the wing coupler 42. This number of maneuvers, which corresponds to the number of times the value of the signal S701, $S_2(P)$ or S'701 is loaded, and depending on the embodiment, may be used to initiate a maintenance operation, in good time, in relation to the wear of the wing coupler.

The invention is described above in the case where the refueling device 2 is mounted on the bowser 1 and connected to a fuel supply network. It is, however, applicable in the case where this device is mounted in a fixed position. It is also applicable in the case where the bowser 1 is a bowser equipped with a fuel tank and a pump.

Alternatively, the cell 701 or 701' of the first embodiment may be mounted on the body 421 without being housed in a half-shell. Likewise, the cell 701 of the second embodiment may be housed in a module attached to the body 421.

According to a variant of the invention (not shown), the battery 502 and certain electronic components may be housed in the space available inside the handles 428 or the handwheel of the wing coupler 42.

According to another variant of the invention (not shown), the number of operations of the valve 422 may be counted locally by the detection member 701 or 701' and stored in a memory mounted on the wing coupler 42, in particular integrated into the electronics associated with the coupler. This memory is periodically accessed by a portable terminal, such as a smartphone or USB key, to retrieve the data it contains. In this case, the electronic electrical transmission system is formed by the connecting members between this memory and this portable terminal, while the processing unit consists of a computer to which the portable terminal will subsequently be connected, for retrieval and processing of the data it contains.

In the various embodiments and variants of the invention, the signal S701 is time stamped.

The characteristics of the embodiments and variants considered above may be combined with each other to generate new embodiments of the invention.

The invention claimed is:

1. A refueling device for refueling an aircraft, comprising a duct for circulating fuel, the downstream end of which is equipped with a wing coupler for connection to an inlet orifice of a fuel tank of the aircraft, the wing coupler comprising:
   a body;
   a front valve that is movable relative to said body;
   at least one detection member for detecting a position of said front valve; and
   an electrical or electronic transmission system for transmission to a processing unit of a signal that is representative of the position of said front valve as detected by said at least one detection member.

2. A refueling device according to claim 1, wherein said at least one detection member detects the position of said front valve directly.

3. A refueling device according to claim 1, further comprising:
   a sensor for measuring the value of a parameter representative of a fuel flow passing through said wing coupler;
   at least one battery for the electrical supply of said sensor; and
   an electronic unit for connecting said at least one battery and said sensor as a function of the position of said front valve as detected by said at least one detection member.

4. A refueling device according to claim 1, further comprising a unit for counting maneuvers of said wing coupler and/or actual duration of use of said wing coupler, on the basis of a signal that is representative of the detected position of said front valve and is transmitted by said electrical or electronic transmission system.

5. A refueling device according to claim 1, further comprising a memory for storing a number of maneuvers of the front valve as detected by said at least one detection member, wherein said electrical or electronic transmission system comprises a portable terminal intended to retrieve the number of maneuvers stored in said memory, and wherein the portable terminal is intended to be connected to a computer forming a processing unit.

6. A method of refueling an aircraft by means of a refueling device according to claim 1, the method comprising controlling means for supplying electric current to a sensor for measuring the value of a parameter representative of a fuel flow passing through the wing coupler, using the signal transmitted by the electrical or electronic transmission system.

7. A method of refueling an aircraft by means of a refueling device according to claim 1, wherein the refueling device comprises a sensor for measuring the value of a parameter representative of a fuel flow passing through the wing coupler, at least one battery for supplying power to the sensor and a unit for connecting the at least one battery and the sensor, the method comprising adapting a frequency of connecting the at least one battery and the sensor according to proximity of the value measured by the sensor to a predetermined threshold value.

8. A method of refueling an aircraft by means of a refueling device according to claim 1, wherein the at least one detection member is designed to detect when the front valve is in an intermediate position between a closed position and a fully open position, the method comprising:
   determining a duration during which the front valve is in the intermediate position;
   comparing the duration determined by said determining with a threshold value; and
   depending on the result of said comparing, considering that the locking maneuver of the coupler on the aircraft takes place in a normal or abnormal manner.

9. A method comprising refueling an aircraft by means of two refueling devices, each refueling device according to claim 1, and each refueling device comprising a sensor for measuring the value of a parameter representative of a fuel flow passing through the wing coupler, at least one battery for supplying power to the sensor, and a unit for connecting the at least one battery and the sensor, wherein for a first one of said two refueling devices, a connection frequency of the at least one battery and the sensor has a first value, and for a second one of said two fueling devices, the connection frequency of the at least one battery and the sensor has a second value distinct from the first value.

10. A method according to claim 9, wherein the second value is less than the first value.

11. A refueling device according to claim 1, wherein said at least one detection member detects the position of said front valve indirectly on the basis of a portion of a front valve operating lever.

12. A refueling device according to claim 11, wherein said at least one detection member comprises a proximity sensor mounted on said body of said wing coupler, near said front valve operating lever when said front valve operating lever is in a predetermined position.

13. A refueling device according to claim 12, wherein the predetermined position is a position where the front valve is in the closed or fully open position.

14. A refueling device according to claim 1, wherein said at least one detection member comprises an electrical contact.

15. A refueling device according to claim 14, wherein said electrical contact comprises a dry electrical contact.

16. A refueling device according to claim 14, wherein said electrical contact comprises a flexible reed switch.

* * * * *